United States Patent
Li

(10) Patent No.: US 10,101,608 B2
(45) Date of Patent: Oct. 16, 2018

(54) MANUFACTURING METHOD OF COLOR FILTER SUBSTRATE

(71) Applicant: Wuhan China Star Optoelectronics Technology Co., Ltd., Wuhan (CN)

(72) Inventor: Anshi Li, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 120 days.

(21) Appl. No.: 15/114,844

(22) PCT Filed: May 19, 2016

(86) PCT No.: PCT/CN2016/082671
§ 371 (c)(1),
(2) Date: Jul. 27, 2016

(87) PCT Pub. No.: WO2017/133136
PCT Pub. Date: Aug. 10, 2017

(65) Prior Publication Data
US 2018/0067358 A1  Mar. 8, 2018

(30) Foreign Application Priority Data
Feb. 1, 2016 (CN) .......................... 2016 1 0071592

(51) Int. Cl.
*G02F 1/1335* (2006.01)
*G02F 1/1339* (2006.01)

(52) U.S. Cl.
CPC ...... *G02F 1/133514* (2013.01); *G02F 1/1339* (2013.01); *G02F 1/133516* (2013.01)

(58) Field of Classification Search
CPC ......... G02F 1/133514; G02F 1/133512; G02F 1/133516; G02F 2001/13396
See application file for complete search history.

(56) References Cited

U.S. PATENT DOCUMENTS 6,661,484 B1 * 12/2003 Iwai .................. G02F 1/133371
349/107
7,443,468 B2 * 10/2008 Okita ................ G02F 1/133371
349/107

(Continued)

FOREIGN PATENT DOCUMENTS

KR      20070057463 A  *  6/2007
KR    1020070057463 A      6/2007

*Primary Examiner* — Jia Pan
(74) *Attorney, Agent, or Firm* — Leong C. Lei

(57) ABSTRACT

The present invention provides a manufacturing method of a color filter substrate, in which a layer of photoresist layer of a negative photoresist resin material is first formed on the color filter film layer; then, back side exposure is conducted on the photoresist layer from the underside of the backing plate so that a part of the photoresist layer that is adjacent to the backing plate gets cured for subsequently forming a planarization layer; afterwards, a mask is used to conduct front side exposure on the photoresist layer from the backing plate to form post spacers; and finally, the photoresist layer that has been subjected to exposure twice is subjected to development to remove a portion of the photoresist layer that has not been cured so as to form, simultaneously, a planarization layer and post spacers located on the planarization layer. This, when compared to an existing manufacturing method of a color filter substrate, can greatly simplify operation flow and thus greatly reduce investment on manufacturing line facility and lower down manufacturing costs of products and potential risks of unexpected problems occurring in the manufacturing process and shortening product manufacturing cycle.

15 Claims, 4 Drawing Sheets

(56) References Cited

U.S. PATENT DOCUMENTS

| | | | |
|---|---|---|---|
| 7,864,278 B2* | 1/2011 | Sato | G02F 1/133528 349/117 |
| 2001/0026347 A1* | 10/2001 | Sawasaki | G02F 1/133707 349/156 |
| 2003/0011729 A1* | 1/2003 | Song | G02F 1/133707 349/107 |
| 2007/0013832 A1* | 1/2007 | Nishida | G02F 1/133514 349/107 |
| 2010/0182549 A1* | 7/2010 | Miyashita | G02F 1/133514 349/106 |
| 2012/0057111 A1* | 3/2012 | Ohkubo | G02F 1/1339 349/106 |

* cited by examiner

MANUFACTURING METHOD OF COLOR FILTER SUBSTRATE

BACKGROUND OF THE INVENTION

1. Field of the Invention

The present invention relates to the field of liquid crystal display technology, and in particular to a manufacturing method of a color filter (CF) substrate.

2. The Related Arts

Liquid crystal displays (LCDs) have a variety of advantages, such as thin device body, low power consumption, and being free of radiation, and thus have wide applications. Most of the LCDs that are currently available in the market are backlighting LCDs, which comprise a liquid crystal display panel and a backlight module. The liquid crystal display panel is generally made up of a color filter (CF) substrate, a thin-film transistor (TFT) substrate, a liquid crystal (LC) layer sandwiched between the CF substrate and the TFT substrate, and sealant. The thickness of the liquid crystal layer, which is referred to as a cell gap, is generally determined by post spacers (PS) arranged between the TFT substrate and the CF substrate. The liquid crystal layer thickness has vital influences on structural parameters and displaying quality of the LCD. Generally, the post spacers are formed on the CF substrate.

The CF substrate generally comprises a base plate, a black matrix formed on the base plate, and a color filter layer, wherein the color filter layer comprises a plurality of filter units of different colors, such as red, green, and blue filter units that are respectively formed of red, green, and blue photosensitive resins. The black matrix functions to define a boundary of each filter unit. To prevent light leaking between adjacent filter units, edges of the filter units are often disposed to overlap the black matrix, and in addition, the filter units are not all formed simultaneously so that the film thicknesses of the filter units are not completely identical. This readily leads to non-flatness of the entirety of the filter layer. Thus, it is common to dispose a planarization layer on the filter layer and then, the post spacers are formed on the planarization layer to ensure desired cell gap and shape of the liquid crystal cells. To provide an effect of buffering for preventing the occurrence of all sorts of defects, it is common to involve at least two types of post spacers. The post spacers generally include main post spacers and sub post spacers. Based on the structure of the color filter substrate described above, a commonly adopted manufacturing flow of a conventional color filter substrate is as follows. A black matrix, a red filter layer, a green filter layer, a blue filter layer, a planarization layer, a sub post spacer layer, and a main post spacer layer are sequentially formed on a base plate and this needs seven processes to complete the color filter substrate. Thus, the conventional manufacturing process of the color filter substrate has high complication and the chance of flaw occurring in the manufacturing process is high so that the potential risk is high.

Thus, it is desired to have a novel manufacturing method of a color filter substrate, which overcomes the above problems.

SUMMARY OF THE INVENTION

An object of the present invention is to provide a manufacturing method of a color filter substrate, which helps simplify a manufacturing flow of a color filter substrate so as to increase manufacturing efficiency and reduce manufacturing cost.

To achieve the above object, the present invention provides a manufacturing method of a color filter substrate, which comprises the following steps:

(1) providing a backing plate and forming a black matrix on the backing plate;

(2) forming a color filter layer on the backing plate and the black matrix;

(3) coating a layer of negative photoresist resin on the color filter layer and the black matrix to form a photoresist layer;

(4) conducting back side exposure on the photoresist layer from an underside of the backing plate such that exposure light transmits through the backing plate and the color filter layer to irradiate on the photoresist layer to cure a portion of the photoresist layer that is adjacent to the backing plate;

(5) providing a mask and using the mask to conduct front side exposure on the photoresist layer from top of the backing plate so as to have a portion of the photoresist layer that corresponds to a pattern of the mask cured; and (6) subjecting the photoresist layer to development in order to remove an uncured part of the photoresist layer to form a planarization layer and post spacers located on the planarization layer;

wherein the planarization layer comprises the portion of the photoresist layer that is cured in step (4); and the post spacers comprise the portion of the photoresist layer that corresponds to the pattern of the mask and is cured in step (5).

The mask provided in step (5) comprises a halftone mask and the mask comprises a first, light-transmitting pattern and a second, partially-light-transmitting pattern; and the post spacers formed in step (6) comprise a main post spacer and a sub post spacer, the main post spacer and the sub post spacer being respectively formed with and corresponding to the first pattern and the second pattern of the mask.

The first pattern of the mask provided in step (5) has light transmission rate of 100% and the second pattern has light transmission rate of 30%-90%, a remaining portion being non-light-transmittable.

The main post spacer is higher than the sub post spacer by 0.1-0.3 μm.

The main post spacer and the sub post spacer are located above and correspond to the black matrix.

The main post spacer and the sub post spacer are conic pillars.

The black matrix formed in step (1) surrounds and defines a plurality of sub-pixel areas on the backing plate; and the color filter layer formed in step (2) has thicknesses that are not consistent in the plurality of sub-pixel areas.

The color filter layer formed in step (2) comprises a plurality of red filter units, green filter units, and blue filter units located in the sub-pixel areas.

The red filter units, the green filter units, and the blue filter units have thicknesses different from each other.

In step (4), the thicknesses of the color filter layer that are not consistent are used to control intensity of the exposure light transmitting through the color filter layer such that the intensity of the exposure light that transmits through a small one of the thicknesses of the color filter layer is strong and a thickness of the portion of the photoresist layer cured thereby is great.

The present invention also provides a manufacturing method of a color filter substrate, which comprises the following steps:

(1) providing a backing plate and forming a black matrix on the backing plate;

(2) forming a color filter layer on the backing plate and the black matrix;

(3) coating a layer of negative photoresist resin on the color filter layer and the black matrix to form a photoresist layer;

(4) conducting back side exposure on the photoresist layer from an underside of the backing plate such that exposure light transmits through the backing plate and the color filter layer to irradiate on the photoresist layer to cure a portion of the photoresist layer that is adjacent to the backing plate;

(5) providing a mask and using the mask to conduct front side exposure on the photoresist layer from top of the backing plate so as to have a portion of the photoresist layer that corresponds to a pattern of the mask cured; and (6) subjecting the photoresist layer to development in order to remove an uncured part of the photoresist layer to form a planarization layer and post spacers located on the planarization layer;

wherein the planarization layer comprises the portion of the photoresist layer that is cured in step (4); and the post spacers comprise the portion of the photoresist layer that corresponds to the pattern of the mask and is cured in step (5);

wherein the mask provided in step (5) comprises a half-tone mask and the mask comprises a first, light-transmitting pattern and a second, partially-light-transmitting pattern; and the post spacers formed in step (6) comprise a main post spacer and a sub post spacer, the main post spacer and the sub post spacer being respectively formed with and corresponding to the first pattern and the second pattern of the mask; and wherein the black matrix formed in step (1) surrounds and defines a plurality of sub-pixel areas on the backing plate; and the color filter layer formed in step (2) has thicknesses that are not consistent in the plurality of sub-pixel areas.

The efficacy of the present invention is that the present invention provides a manufacturing method of a color filter substrate, in which a layer of photoresist layer of a negative photoresist resin material is first formed on the color filter film layer; then, back side exposure is conducted on the photoresist layer from the underside of the backing plate so that a part of the photoresist layer that is adjacent to the backing plate gets cured for subsequently forming a planarization layer; afterwards, a mask is used to conduct front side exposure on the photoresist layer from the backing plate to form post spacers; and finally, the photoresist layer that has been subjected to exposure twice is subjected to development to remove a portion of the photoresist layer that has not been cured so as to form, simultaneously, a planarization layer and post spacers located on the planarization layer. This, when compared to an existing manufacturing method of a color filter substrate, can greatly simplify operation flow and thus greatly reduce investment on manufacturing line facility and lower down manufacturing costs of products and potential risks of unexpected problems occurring in the manufacturing process and shortening product manufacturing cycle.

BRIEF DESCRIPTION OF THE DRAWINGS

The features and technical contents of the present invention will be better understood by referring to the following detailed description and drawings of the present invention. However, the drawings are provided for the purpose of reference and illustration and are not intended to limit the scope of the present invention.

In the drawing.

DETAILED DESCRIPTION OF THE PREFERRED EMBODIMENTS

To further expound the technical solution adopted in the present invention and the advantages thereof, a detailed description is given to a preferred embodiment of the present invention with reference to the attached drawings.

Figure 1:
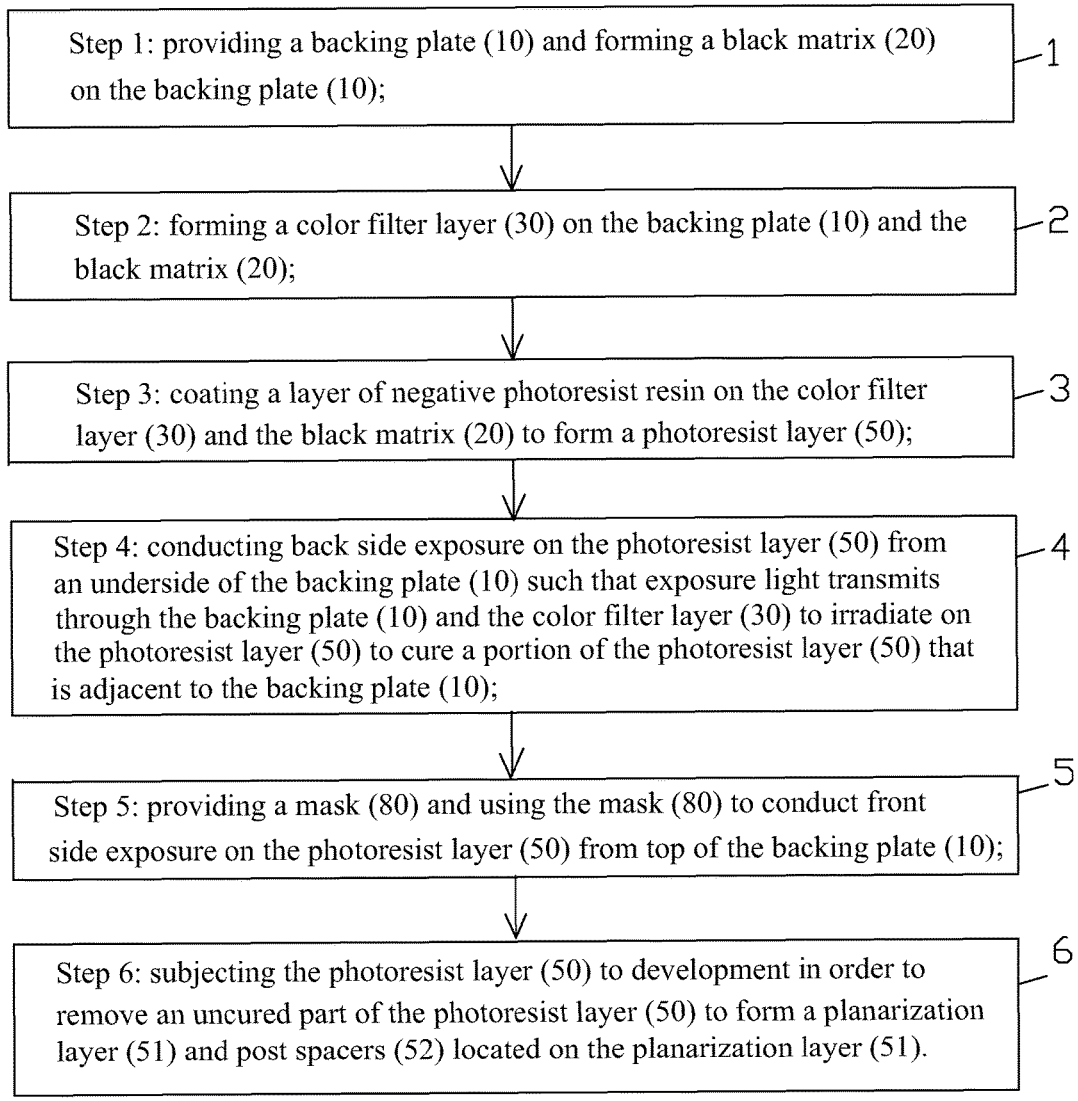
FIG. 1 is a flow chart illustrating a manufacturing method of a color filter substrate according to the present invention.
Figure 2:
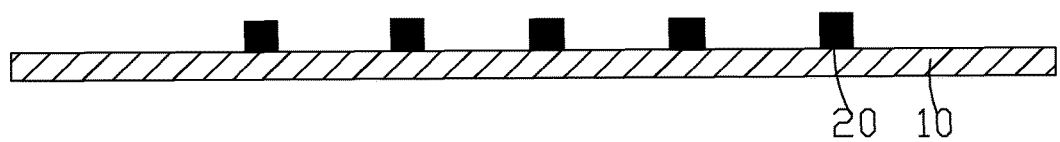
FIG. 2 is a schematic view illustrating step 1 of the manufacturing method of the color filter substrate according to the present invention.

Referring to FIGS. 1-7, the present invention provides a manufacturing method of a color filter substrate, which comprises the following steps:

Step 1: as shown in FIG. 2, providing a backing plate 10 and forming a black matrix 20 on the backing plate 10.

Specifically, the black matrix 10 formed in Step 1 surrounds and defines a plurality of sub-pixel areas on the backing plate 10.

Figure 3:
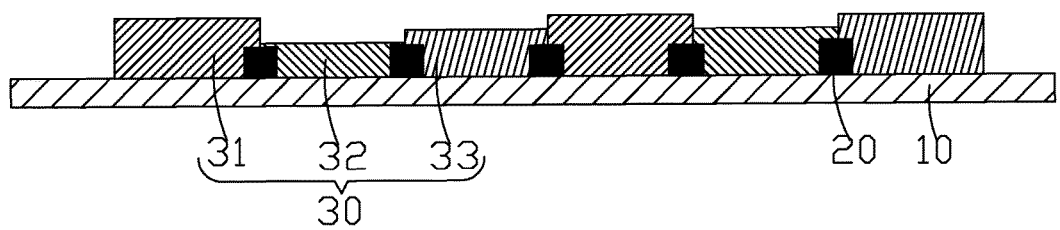
FIG. 3 is a schematic view illustrating step 2 of the manufacturing method of the color filter substrate according to the present invention.

Step 2: as shown in FIG. 3, forming a color filter layer 30 on the backing plate 10 and the black matrix 20.

Specifically, the color filter layer 30 formed in Step 2 has thicknesses that are not consistent in the plurality of sub-pixel areas.

Specifically, the color filter layer 30 formed in Step 2 comprises a plurality of red filter units 31, green filter units 32, and blue filter units 33 located in the sub-pixel areas and thicknesses of the red filter units 31, the green filter units 32, and the blue filter units 33 are different from each other.

Preferably, the thickness of the red filter units 31 is greater than the thickness of the blue filter units 33 and the thickness of the blue filter units 33 is greater than the thickness of the green filter units 32.

Figure 4:
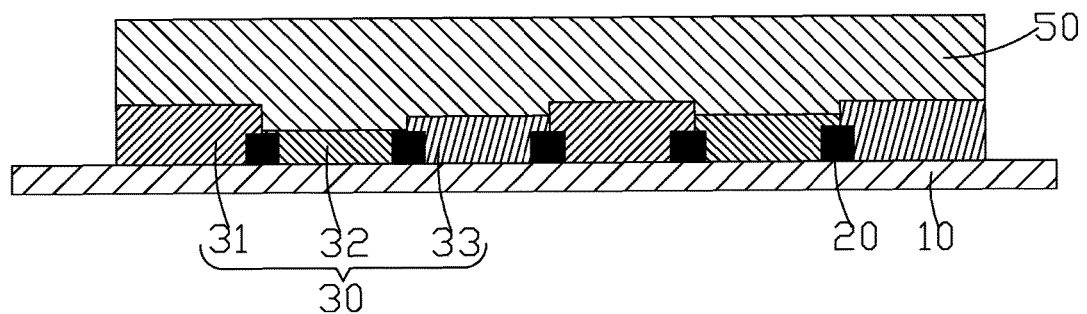
FIG. 4 is a schematic view illustrating step 3 of the manufacturing method of the color filter substrate according to the present invention.

Step 3: as shown in FIG. 4, coating a layer of negative photoresist resin on the color filter layer 30 and the black matrix 20 to form a photoresist layer 50.

Specifically, the photoresist layer 50 that is formed through coating conducted in Step 3 has an upper surface that is flat.

Figure 5:
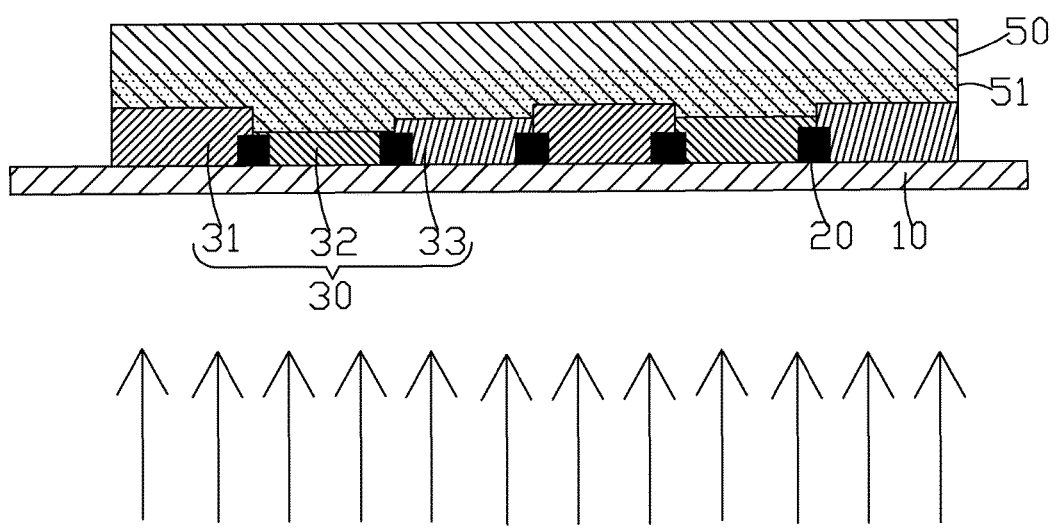
FIG. 5 is a schematic view illustrating step 4 of the manufacturing method of the color filter substrate according to the present invention.

Step 4: as shown in FIG. 5, conducting back side exposure on the photoresist layer 50 from an underside of the backing plate 10 such that exposure light transmits through the backing plate 10 and the color filter layer 30 to irradiate on the photoresist layer 50 to cure a portion of the photoresist layer 50 that is adjacent to the backing plate 10.

Specifically, the exposure light comprises ultraviolet (UV) light.

In Step 4, although the red filter units 31, the green filter units 32, and the blue filter units 33 that are formed in Step 2 have different thicknesses, the thickness inconsistency among the red filter units 31, the green filter units 32, and the blue filter units 33 causes inhomogeneity of intensity of the exposure light applied thereto. For example, for the red filter units 31 that have a relatively large thickness, the intensity of the exposure light transmitting therethrough is relatively weak, meaning a portion of the photoresist layer 50 located thereon receives a weak intensity of exposure light, and thus a cured part thereof would have a reduced thickness; and for the green filter units 32 that have a relatively small thickness, the intensity of the exposure light transmitting therethrough is relatively strong, meaning a portion of the photoresist layer 50 located thereon receives a strong intensity of exposure light, and thus a cured part thereof would have an expanded thickness; and the final result would be that the cured part of the photoresist layer 50 that corresponds to the filter units having a larger thickness has a reduced thickness, while the cured part of the photoresist layer 50 that corresponds to the filter units having a smaller thickness has an expanded thickness, such that a planarization layer 51 formed in this has inconsistent thickness in various portions thereof and may compensate the thickness irregularity of the color filter layer 30, making an upper surface of the cured part of the photoresist layer 50 in Step 4 a substantially planar surface, meaning the upper surface of the planarization layer 51 is a planar surface and the purpose of planarization can be achieved.

Figure 6:
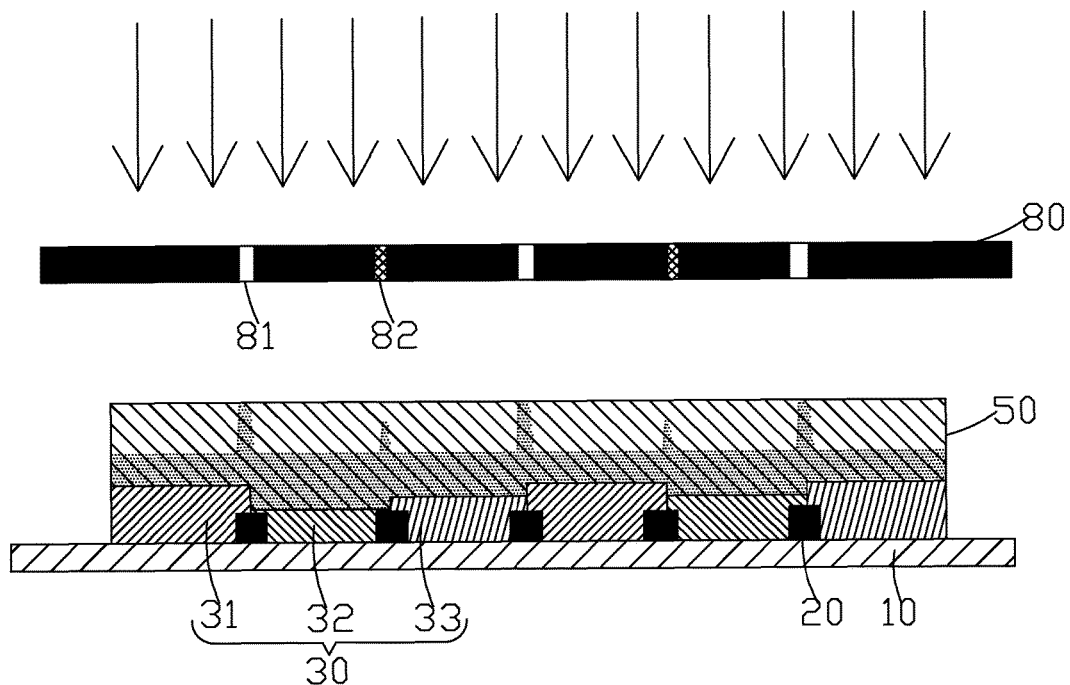
FIG. 6 is a schematic view illustrating step 5 of a preferred embodiment of the manufacturing method of the color filter substrate according to the present invention.

Step 5: as shown in FIG. 6, providing a mask 80, wherein the mask 80 comprises a first pattern 81 that is light transmittable and a second pattern 82 that is partially light-transmittable, and using the mask 80 to conduct front side exposure on the photoresist layer 50 from top of the backing plate 10.

Specifically, Step 5 provides a halftone mask 80 of which the first pattern 81 has light transmission rate of 100% and the second pattern 82 has light transmission rate of 30%-90%, and remaining portion is non-light-transmittable.

Specifically, through adjusting the light transmission rate of the second pattern, it is possible to have a main post spacer 521 that is formed subsequently higher than a sub post spacer 522 by a vertical difference of 0.1-0.3 μm.

It is noted that in the instant embodiment, the mask 80 used is a halftone mask, which may form two types of post spacer, namely the main post spacer and the sub post spacer; however, in other embodiments, masks of other types may be used, such as in case that just one type of post spacer (namely single PS) is to be formed, an ordinary mask can be used to form only the main post spacer on the planarization layer. It is certain that multiple masks can be used in multiple operations of exposure to form multiple types of post spacer.

Figure 7:
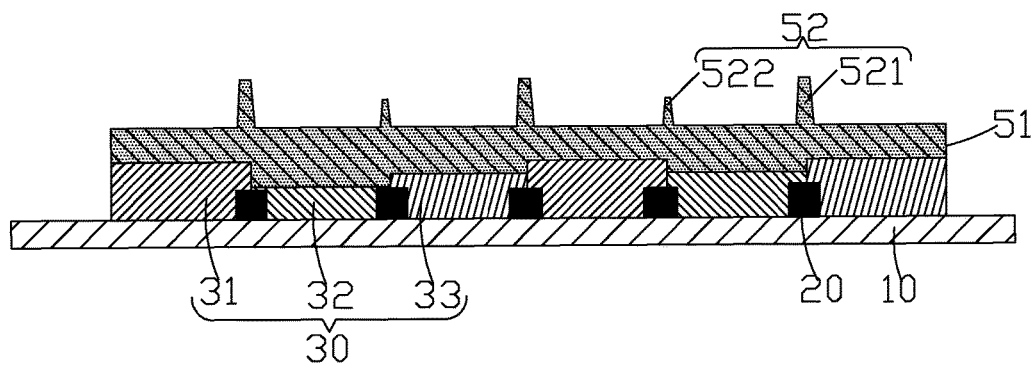
FIG. 7 is a schematic view illustrating step 6 of a preferred embodiment of the manufacturing method of the color filter substrate according to the present invention.

Step 6: as shown in FIG. 7, subjecting the photoresist layer 50 to development in order to remove an uncured part of the photoresist layer 50 to form a planarization layer 51 and post spacers 52 located on the planarization layer 51.

The planarization layer 51 is a portion of the photoresist layer 50 that is cured in Step 4.

The post spacers 52 comprise main post spacers 521 and sub post spacers 522. The main post spacers 521 and the sub post spacers 522 respectively are formed with and correspond to the first pattern 81 and the second pattern 82 of the halftone mask 80.

Specifically, the main post spacers 521 and the sub post spacers 522 are located above and correspond to the black matrix 20.

Specifically, the main post spacers 521 and the sub post spacer 522 are both in the form of conic pillars.

In summary, the present invention provides a manufacturing method of a color filter substrate, in which a layer of photoresist layer of a negative photoresist resin material is first formed on the color filter film layer;

then, back side exposure is conducted on the photoresist layer from the underside of the backing plate so that a part of the photoresist layer that is adjacent to the backing plate gets cured for subsequently forming a planarization layer; afterwards, a mask is used to conduct front side exposure on the photoresist layer from the backing plate to form post spacers; and finally, the photoresist layer that has been subjected to exposure twice is subjected to development to remove a portion of the photoresist layer that has not been cured so as to form, simultaneously, a planarization layer and post spacers located on the planarization layer. This, when compared to an existing manufacturing method of a color filter substrate, can greatly simplify operation flow and thus greatly reduce investment on manufacturing line facility and lower down manufacturing costs of products and potential risks of unexpected problems occurring in the manufacturing process and shortening product manufacturing cycle.

Based on the description given above, those having ordinary skills of the art may easily contemplate various changes and modifications of the technical solution and technical ideas of the present invention and all these changes and modifications are considered within the protection scope defined by the claims of the present invention.

What is claimed is:

1. A manufacturing method of a color filter substrate, comprising the following steps:
   (1) providing a backing plate and forming a black matrix on the backing plate;
   (2) forming a color filter layer on the backing plate and the black matrix;
   (3) coating a layer of negative photoresist resin on the color filter layer and the black matrix to form a photoresist layer;
   (4) conducting back side exposure on the photoresist layer from an underside of the backing plate such that exposure light transmits through the backing plate and the color filter layer to irradiate on the photoresist layer to cure a portion of the photoresist layer that is adjacent to the backing plate;
   (5) providing a mask and using the mask to conduct front side exposure on the photoresist layer from top of the backing plate so as to have a portion of the photoresist layer that corresponds to a pattern of the mask cured; and
   (6) subjecting the photoresist layer to development in order to remove an uncured part of the photoresist layer to form a planarization layer and post spacers located on the planarization layer;
   wherein the planarization layer comprises the portion of the photoresist layer that is cured in step (4); and
   the post spacers comprise the portion of the photoresist layer that corresponds to the pattern of the mask and is cured in step (5);
   wherein the black matrix formed in step (1) surrounds and defines a plurality of sub-pixel areas on the backing plate; and the color filter layer formed in step (2) has thicknesses that are not consistent in the plurality of sub-pixel areas; and
   wherein in step (4), the thicknesses of the color filter layer that are not consistent are used to control intensity of the exposure light transmitting through the color filter layer such that the intensity of the exposure light that transmits through a smallest one of the thicknesses of the color filter layer is strongest and a thickness of the portion of the photoresist layer cured thereby is greatest.

2. The manufacturing method of the color filter substrate as claimed in claim 1, wherein the mask provided in step (5) comprises a halftone mask and the mask comprises a first light-transmitting pattern and a second partially-light-transmitting pattern; and the post spacers formed in step (6) comprise a main post spacer and a sub post spacer, the main post spacer and the sub post spacer being respectively formed with and corresponding to the first pattern and the second pattern of the mask.

3. The manufacturing method of the color filter substrate as claimed in claim 2, wherein the first pattern of the mask provided in step (5) has light transmission rate of 100% and the second pattern has light transmission rate of 30%-90%, a remaining portion being non-light-transmittable.

4. The manufacturing method of the color filter substrate as claimed in claim 3, wherein the main post spacer is higher than the sub post spacer by 0.1-0.3 μm.

5. The manufacturing method of the color filter substrate as claimed in claim 2, wherein the main post spacer and the sub post spacer are located above and correspond to the black matrix.

6. The manufacturing method of the color filter substrate as claimed in claim 2, wherein the main post spacer and the sub post spacer are conic pillars.

7. The manufacturing method of the color filter substrate as claimed in claim 2, wherein the color filter layer formed in step (2) comprises a plurality of red filter units, green filter units, and blue filter units located in the sub-pixel areas.

8. The manufacturing method of the color filter substrate as claimed in claim 7, wherein the red filter units, the green filter units, and the blue filter units have thicknesses different from each other.

9. A manufacturing method of a color filter substrate, comprising the following steps:
 (1) providing a backing plate and forming a black matrix on the backing plate;
 (2) forming a color filter layer on the backing plate and the black matrix;
 (3) coating a layer of negative photoresist resin on the color filter layer and the black matrix to form a photoresist layer;
 (4) conducting back side exposure on the photoresist layer from an underside of the backing plate such that exposure light transmits through the backing plate and the color filter layer to irradiate on the photoresist layer to cure a portion of the photoresist layer that is adjacent to the backing plate;
 (5) providing a mask and using the mask to conduct front side exposure on the photoresist layer from top of the backing plate so as to have a portion of the photoresist layer that corresponds to a pattern of the mask cured; and
 (6) subjecting the photoresist layer to development in order to remove an uncured part of the photoresist layer to form a planarization layer and post spacers located on the planarization layer;
wherein the planarization layer comprises the portion of the photoresist layer that is cured in step (4); and
the post spacers comprise the portion of the photoresist layer that corresponds to the pattern of the mask and is cured in step (5);
wherein the mask provided in step (5) comprises a halftone mask and the mask comprises a first light-transmitting pattern and a second partially-light-transmitting pattern; and the post spacers formed in step (6) comprise a main post spacer and a sub post spacer, the main post spacer and the sub post spacer being respectively formed with and corresponding to the first pattern and the second pattern of the mask;
wherein the black matrix formed in step (1) surrounds and defines a plurality of sub-pixel areas on the backing plate; and the color filter layer formed in step (2) has thicknesses that are not consistent in the plurality of sub-pixel areas; and
wherein in step (4), the thicknesses of the color filter layer that are not consistent are used to control intensity of the exposure light transmitting through the color filter layer such that the intensity of the exposure light that transmits through a smallest one of the thicknesses of the color filter layer is strongest and a thickness of the portion of the photoresist layer cured thereby is greatest.

10. The manufacturing method of the color filter substrate as claimed in claim 9, wherein the first pattern of the mask provided in step (5) has light transmission rate of 100% and the second pattern has light transmission rate of 30%-90%, a remaining portion being non-light-transmittable.

11. The manufacturing method of the color filter substrate as claimed in claim 10, wherein the main post spacer is higher than the sub post spacer by 0.1-0.3 μm.

12. The manufacturing method of the color filter substrate as claimed in claim 9, wherein the main post spacer and the sub post spacer are located above and correspond to the black matrix.

13. The manufacturing method of the color filter substrate as claimed in claim 9, wherein the main post spacer and the sub post spacer are conic pillars.

14. The manufacturing method of the color filter substrate as claimed in claim 9, wherein the color filter layer formed in step (2) comprises a plurality of red filter units, green filter units, and blue filter units located in the sub-pixel areas.

15. The manufacturing method of the color filter substrate as claimed in claim 14, wherein the red filter units, the green filter units, and the blue filter units have thicknesses different from each other.

* * * * *